US011090865B2

(12) United States Patent
Stadlmann

(10) Patent No.: US 11,090,865 B2
(45) Date of Patent: Aug. 17, 2021

(54) DEVICE AND METHOD FOR INCREASING THE ADHESION OF A COMPONENT LAYER TO A CARRIER OBJECT

(71) Applicant: Klaus Stadlmann, Vienna (AT)

(72) Inventor: Klaus Stadlmann, Vienna (AT)

( * ) Notice: Subject to any disclaimer, the term of this patent is extended or adjusted under 35 U.S.C. 154(b) by 288 days.

(21) Appl. No.: 16/095,229

(22) PCT Filed: Apr. 19, 2017

(86) PCT No.: PCT/AT2017/060098
§ 371 (c)(1),
(2) Date: Oct. 19, 2018

(87) PCT Pub. No.: WO2017/181209
PCT Pub. Date: Oct. 26, 2017

(65) Prior Publication Data
US 2019/0084230 A1    Mar. 21, 2019

(30) Foreign Application Priority Data

Apr. 19, 2016 (AT) ............................... A 50350/2016

(51) Int. Cl.
*B29C 64/245*     (2017.01)
*B29C 64/264*     (2017.01)
(Continued)

(52) U.S. Cl.
CPC .......... *B29C 64/245* (2017.08); *B29C 64/124* (2017.08); *B29C 64/135* (2017.08);
(Continued)

(58) Field of Classification Search
CPC ....... B29C 64/00; B29C 64/20; B29C 64/245; B29C 64/124; B29C 64/264;
(Continued)

(56) References Cited

U.S. PATENT DOCUMENTS 4,752,498 A    6/1988  Fudim
10,040,224 B2 *  8/2018  Saruhashi  ............... B29C 41/22
(Continued)

FOREIGN PATENT DOCUMENTS

DE      103 26 223 A1    1/2005
WO      2010/045951 A1   4/2010

OTHER PUBLICATIONS

International Search Report and Written Opinion of the International Searching Authority for International Patent Application No. PCT/AT2017/060098 dated Jul. 31, 2017, 13 pages.
(Continued)

*Primary Examiner* — Jacob T Minskey
*Assistant Examiner* — Baileigh Kate Darnell
(74) *Attorney, Agent, or Firm* — Merchant & Gould P.C.

(57) ABSTRACT

An object (3) is adhesively attached to an object carrier (15) in a stereolithographic process. The object (3) is formed by the curing of a photosensitive substance (5) by curing radiation, at least in one region of the object carrier (15). Secondary radiation is radiated to the object carrier (15) in a direction that is different from the direction of the curing radiation in order to adhesively attach the object (3). The secondary radiation is supplied laterally to the generally planar, radiation-permeable object carrier (15) and is deflected within the object carrier (15).

21 Claims, 7 Drawing Sheets

(51) Int. Cl.
*B29C 64/277* (2017.01)
*B29C 64/20* (2017.01)
*B33Y 10/00* (2015.01)
*B33Y 30/00* (2015.01)
*B29C 64/124* (2017.01)
*B29C 64/135* (2017.01)

(52) U.S. Cl.
CPC ............ *B29C 64/264* (2017.08); *B33Y 10/00* (2014.12); *B33Y 30/00* (2014.12)

(58) Field of Classification Search
CPC ... B29C 64/135; B29C 64/286; B29C 64/277; B33Y 10/00; B33Y 30/00
See application file for complete search history.

(56) References Cited

U.S. PATENT DOCUMENTS

| | | |
|---|---|---|
| 2010/0291489 A1 | 11/2010 | Moskovits et al. |
| 2012/0248657 A1 | 10/2012 | Ebert et al. |
| 2015/0202805 A1 | 7/2015 | Saruhashi et al. |
| 2015/0290874 A1 | 10/2015 | Chen et al. |
| 2018/0003956 A1* | 1/2018 | Kim ...................... H04N 1/113 |

OTHER PUBLICATIONS

Austrian Office Action for corresponding Austrian Patent Application No. A 50350/2016 dated Nov. 23, 2016, 4 pages.

\* cited by examiner

DEVICE AND METHOD FOR INCREASING THE ADHESION OF A COMPONENT LAYER TO A CARRIER OBJECT

This application is a National Stage Application of PCT/AT2017/060098, filed 19 Apr. 2017, which claims benefit of Serial No. A 50350/2016, filed 19 Apr. 2016 in Austria, and which applications are incorporated herein by reference. To the extent appropriate, a claim of priority is made to each of the above-disclosed applications.

BACKGROUND OF THE INVENTION

The invention relates to a method for adhering an object to an object carrier in a stereolithographic process, the object being formed by the curing of a photosensitive substance by means of curing radiation, wherein at least in one partial region of the object carrier, a secondary radiation is radiated to the object carrier in a direction that is different from the direction of the curing radiation in order to adhesively attach the object. The invention further relates to a device for performing this method.

Methods and devices are known, which aim to increase the adhesion of component layers at the beginning of a stereolithographic process. An example of this is the technique described in WO 2010/045951, in which light is additionally coupled from above into a photoreactive substance through a construction platform whose underside is light-permeable. The consequence of this is that the additional radiation allows better adhesion of the first component layers. However, this known solution has various disadvantages: For example, the light source is located in the construction platform itself and is moved together with it, although the light source is used only during the first component layers. This requires the supply of electricity to the construction platform. Furthermore, by integrating the light source into the construction platform, its costs are substantially increased and no system can be created which permits a single use. Likewise, the construction platform cannot be placed, or can be placed only with difficulty, simultaneously with the component located thereon in a cleaning installation or the like, since the cleaning liquid can penetrate into the construction platform and contaminate the light source.

From US 2015/290874 A1 is known a device in which light layout is guided around a vat to an object located above it. A mirror used in this case serves at the same time for illuminating the underside of the vat.

SUMMARY OF THE INVENTION

The object of the invention is to solve the difficulties and problems known from the prior art, to allow a better and more economical integration into an equipment concept for producing three-dimensional objects and to achieve better adhesion of the first object layers during a construction process.

In order to solve this object, the method according to the invention provides, in particular, that the secondary radiation is supplied laterally to the generally planar, radiation-permeable object carrier and is deflected within the object carrier.

The device according to the invention is distinguished by a secondary radiation source arranged laterally at a distance from the object carrier and by the fact that the object carrier is at least partially permeable to the secondary radiation.

In the present stereolithography technique, an adhesive attachment of the object to the object carrier is thus accomplished by the secondary radiation. The light sources are not located in the object carrier; the light sources can be located at a local distance from it and can be arranged, for example, around the object carrier, the object carrier having a plurality of openings or windows, at least partially light-permeable, through which the light can be coupled in and/or out. The object carrier can, for example, be moved independently with respect to the secondary light source and/or the primary light source, and both light sources can be arranged and realised such that they permit an irradiation of the object carrier or the coupling in of light over a region which comprises at least the first and/or the first two, five, ten or twenty component layer(s).

By "light" or "radiation" herein is understood any type of electromagnetic radiation, such as, for example, also ultraviolet radiation or infrared radiation. The light sources have at least one radiation emitter, such as, for example, an LED, which can emit radiation in at least one specific wavelength range; the light sources preferably have a plurality of radiation sources, such as, for example, a plurality of LEDs with different wavelengths and radiation behaviours, so that an entire wavelength range of, for example, 365 nm to 405 nm can be covered and/or selectively addressed. Preferably, a wavelength is used for coupling into the construction platform which allows deeper curing of the photoreactive substance. This can be achieved, for example, by having the central wavelength located in a wavelength range in which a photoinitiator used is less potent (e.g., 405 nm). In this case, the central wavelength may differ, for example, in the UV range, by 5 nm, 10 nm, 20 nm, 40 nm or more, depending on the photoinitiator used, from the primary radiation used for curing the photoreactive substance. Furthermore, the light sources can be controlled temporally and/or in their intensity and independently of one another.

The construction platform is preferably configured, in terms of construction, such that a coupling in of the radiation as efficient and low in scattering radiation as possible can be allowed. In particular, the construction platform can be configured such that it acts as a kind of "light guide" and has, for example, a chamber in which an at least partially reflecting surface (such as e.g. a mirror sheet, a mirror plate, etc.) or, for example, a locally adjustable mirror is located. The radiation can be coupled into the construction platform or the object carrier such that a variation of the local intensity maxima can be achieved; this can occur, for example, by changing the position of the object carrier, by changing the angle of incidence of the radiation, and/or by a local change of a deflection mirror within the object carrier, by changing the LED current, by the DMD present in the primary light source.

Preferably, both light sources can also be used for other purposes, such as, for example, for illuminating the interior, for signalling a process stage (e.g. completion of the object, process pause and process termination), for curing the remaining photoreactive substance and for post-exposure of the generated components, as well as, for example, a light source in combination with a camera, for 3D scanning the generated component. For this purpose, for example, at least one of the light sources used, depending on the desired function, can be constructed correspondingly from at least one radiation source (LED) having a central wavelength and/or can be equipped with an optical system, and it can be triggered in a targeted manner, individually or in sections (e.g. according to lines and columns of an LED array), by a controller with respect to the intensity, the radiation duration, optionally with respect to the radiation pattern (e.g. a line pattern) and the position of the radiation input. This allows a location-dependent, intensity-dependent and time-dependent radiation input into the construction platform as well as the possibility of radiating or coupling in radiation at different positions of the LED array and/or of using different emitters or wavelengths. Thus, there is the possibility of, for example, when using at least one UV-LED panel, triggering only the radiation region which can be coupled into the object carrier at the corresponding position; at a later point in time, such as, for example, after completion of the three-dimensional body and corresponding post-treatment steps (cleaning of the object, etc.), the generated object can be post-exposed by, for example, triggering all UV-LEDs or all panels used, for example, with the aid of the secondary light source, and, optionally, the primary light source.

With regard to a simple, inexpensive configuration, it is preferred that the secondary radiation is derived from the curing radiation. On the other hand, it is also convenient in many cases that a radiation which is independent of the curing radiation is used as secondary radiation. Furthermore, it is advantageous that the secondary radiation is supplied to the object carrier via a light guide. It can also be provided that the secondary radiation is adjusted over an adhesion region during the adhesive attachment process.

With respect to the present device, it is particularly advantageous that the secondary radiation source is formed by a light guide. In this case, it is further convenient that the light guide is connected to a stereolithography main radiation source in a light-conducting manner.

On the other hand, it is also advantageous that a secondary radiation source independent of a main radiation source is provided.

It is further convenient that the object carrier is realised to be partially permeable to the radiation and at least partially reflective in order to deflect the secondary radiation to an adhesion region for the object. The object carrier can also include a mirror surface. In this case, it is further advantageous that the mirror surface is realised to be diffusely reflecting. On the other hand, it can also be provided that the object carrier includes a movably arranged deflection mirror. Finally, it is preferred that the object carrier has an adhesion base plate which is at least partially permeable to the radiation.

BRIEF DESCRIPTION OF THE DRAWINGS

The invention will be explained below with reference to preferred exemplary embodiments which, however, are non-limiting, and with reference to the drawings. More specifically.

DETAILED DESCRIPTION OF THE PREFERRED EMBODIMENT

Figure 1:
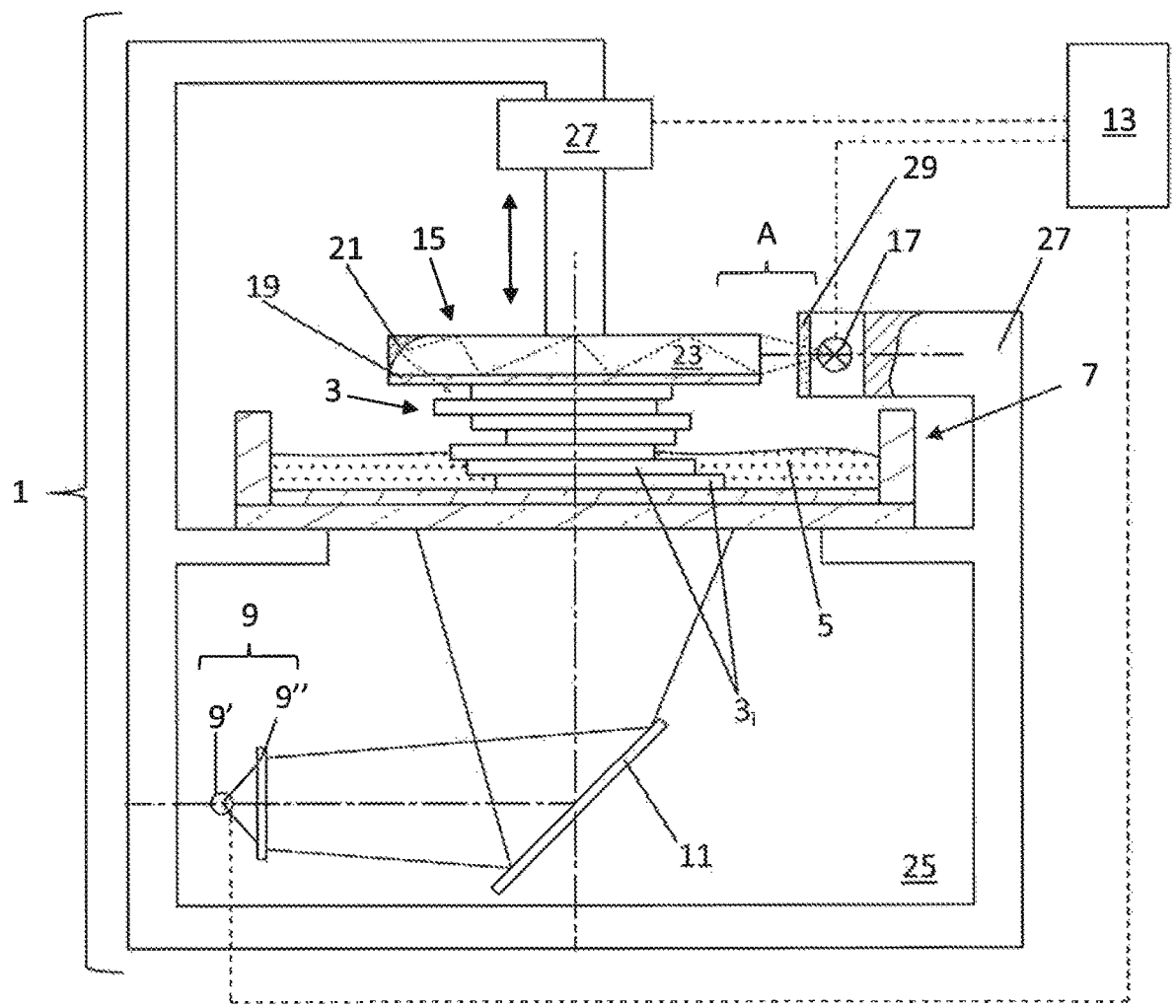
FIG. 1 shows a schematic view of an exemplary embodiment of a stereolithography device.

FIG. 1 shows by way of example an exemplary embodiment of a stereolithography device 1, partially in a sectional representation, this device 1 being configured for the generation layer-by-layer, from individual layers 3, $3_i$, of at least one three-dimensional body or object 3 which is produced by selective solidification or curing of a photoreactive substance 5 which is located in a vat 7, wherein layer information is generated with the aid of a primary light source 9 and, optionally, with the aid of a deflection mirror 11. The primary light source 9 can be a controllable laser, preferably, a pixel-based digital mask projection unit. The primary light source 9 can be controlled via a control device 13. The photosensitive substance 5 is liquid, by the term "liquid" being understood all liquids of any viscosity, including pasty substances, as well as filled or pigmented liquids. The primary light source 9 is made of, for example, a radiation emitter 9' (e.g. a UV LED) and a mask exposure device 9" such as e.g. a DMD (Digital Mirror Device) or a DLP (Digital Light Processing) structure which is capable of generating a pixel-based image.

The generated layers $3_i$, cured by the primary light source 9, adhere to a construction platform 15 which serves as an object carrier and which, furthermore, is at least partially transparent to the radiation of at least one laterally arranged secondary light source 17 and can be realised as being at least partially reflective in order to make possible that the secondary radiation of the light source 17 emerges downward as a result of reflection through the at least partially transparent base plate 19 of the construction platform 15. By secondary radiation is understood radiation which is likewise suitable for curing the photoreactive substance 5, which has at least one central wavelength (e.g. 405 nm) and at least one type of radiation source (e.g. LED) and can be controlled by the control device 13, preferably independently of the primary light source 9. In the exemplary embodiment shown in FIG. 1, the secondary radiation is deflected, for example, by a reflector 21 (e.g. a mirror, a reflecting foil, or by the interior space itself) which is located within the construction platform 9 in a secondary radiation space 23 or which is formed by the latter.

According to FIG. 1, the primary light source 9 is located below the vat 7 in a machine space 25 and it can be arranged, for example, on a frame 27 in a movable manner.

According to FIG. 1, the secondary radiation source 17 is arranged such that it can introduce secondary radiation into the construction platform 15 at least over a certain region, for example at the beginning of the construction process (e.g. over the first 2, 5, 10 or 20 layers), and is at least only temporarily in direct contact with the construction platform 15, preferably arranged at a distance A (e.g. 0.1 mm, 1 mm to 10 mm—depending on the embodiment variant) from the construction platform 15. The construction platform 15 can be raised or lowered by an actuator 27 and with the aid of the control device 13, for example, with respect to the vat 7 in accordance with the advance of the process.

As represented in FIG. 1, the secondary radiation source 17 can be attached, for example, to the machine frame 27 at a suitable location, and it emits the secondary radiation, for example, through a protective window 29, it also being possible to arrange optical elements (lenses, diffusing plates, light guides, etc.) between the secondary radiation source 17 and the construction platform 15.

By means of a corresponding arrangement and the use of a plurality of secondary radiation sources 17 or by dividing the secondary radiation, an almost annular illumination of the construction platform 15 can be allowed by the lateral coupling in from a plurality of sides.

Figure 2:
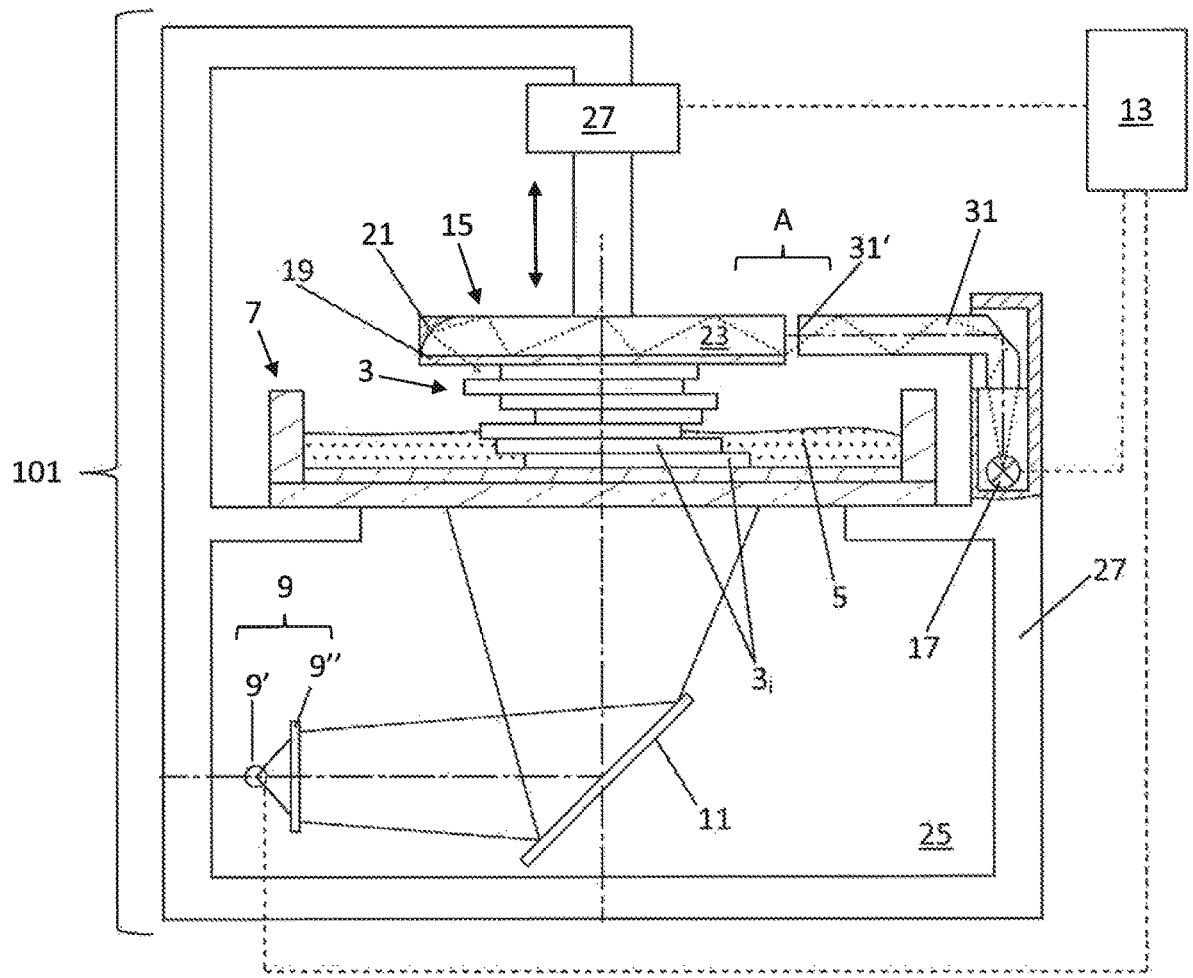
FIGS. 2, 3 and 4 show views of embodiments of such a device modified with respect to FIG. 1.

In comparison to FIG. 1, FIG. 2 shows an embodiment of a stereolithography device 101 in which at least one secondary radiation source 17 is arranged, for example, in the frame 27, below the construction platform 15, and the secondary radiation is conducted by at least one light guide 31 (e.g. a light rod) which is at least partially transparent for the secondary radiation, a 90° deflection being optionally possible, as represented in FIG. 2, in order to couple secondary radiation into the construction platform 15 from at least one side. The optical waveguide 31 can be detachably connected to the frame 27 or the secondary light source 17. This arrangement protects the secondary light source 17 from contamination and allows a geometrical and optical (e.g. circular, rectangular, lenticular, etc.) configuration of the coupling-out surface of the light guide 31 as well as the coupling in at a certain angle by its geometrical configuration; the geometry of the light guide 31 is preferably realised such that as few scattered beams as possible can emerge. The light guide 31, which is preferably realised in one piece, can be provided with a sheath, lacquer layer, etc., which is non-transparent and/or reflective to the secondary radiation, in order to prevent scattered radiation from emerging and in order to maximise the light emission of the secondary radiation from the front face 31'.

Figure 3:
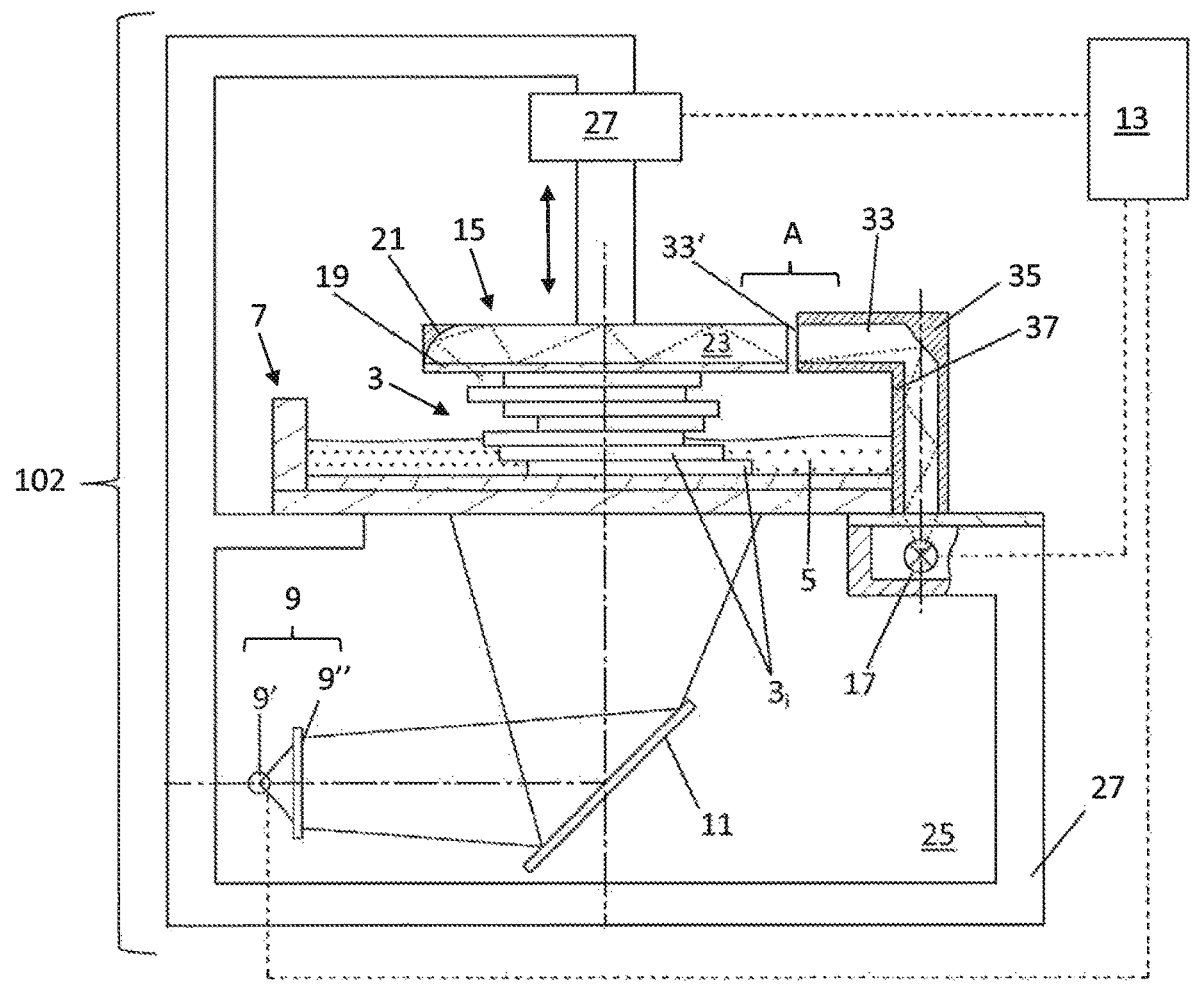

FIG. 3 shows a further embodiment of a stereolithography device 102 in which the secondary radiation is deflected on one side, for example, from below, with the aid of an edge part 33 of the vat 7, in particular preferably with at least one edge part 33 of the vat 7, at least partially transparent to the secondary radiation and realised in at least one part, which acts as a light guide for the secondary radiation which can thus be coupled laterally into the construction platform 15 at least at one point. To minimise or prevent the propagation of scattered radiation within the vat 7 and/or through the vat 7, which could lead to an undesired activation of the photosensitive substance 5, the edge part 33 of the vat 7 can preferably be shielded by at least one non-transparent side wall, e.g. at least one partially reflecting side wall and/or lacquer layers, e.g. 35, 37, so that only one lateral irradiation into the construction platform 15 takes place via the front face 33'.

Figure 4:
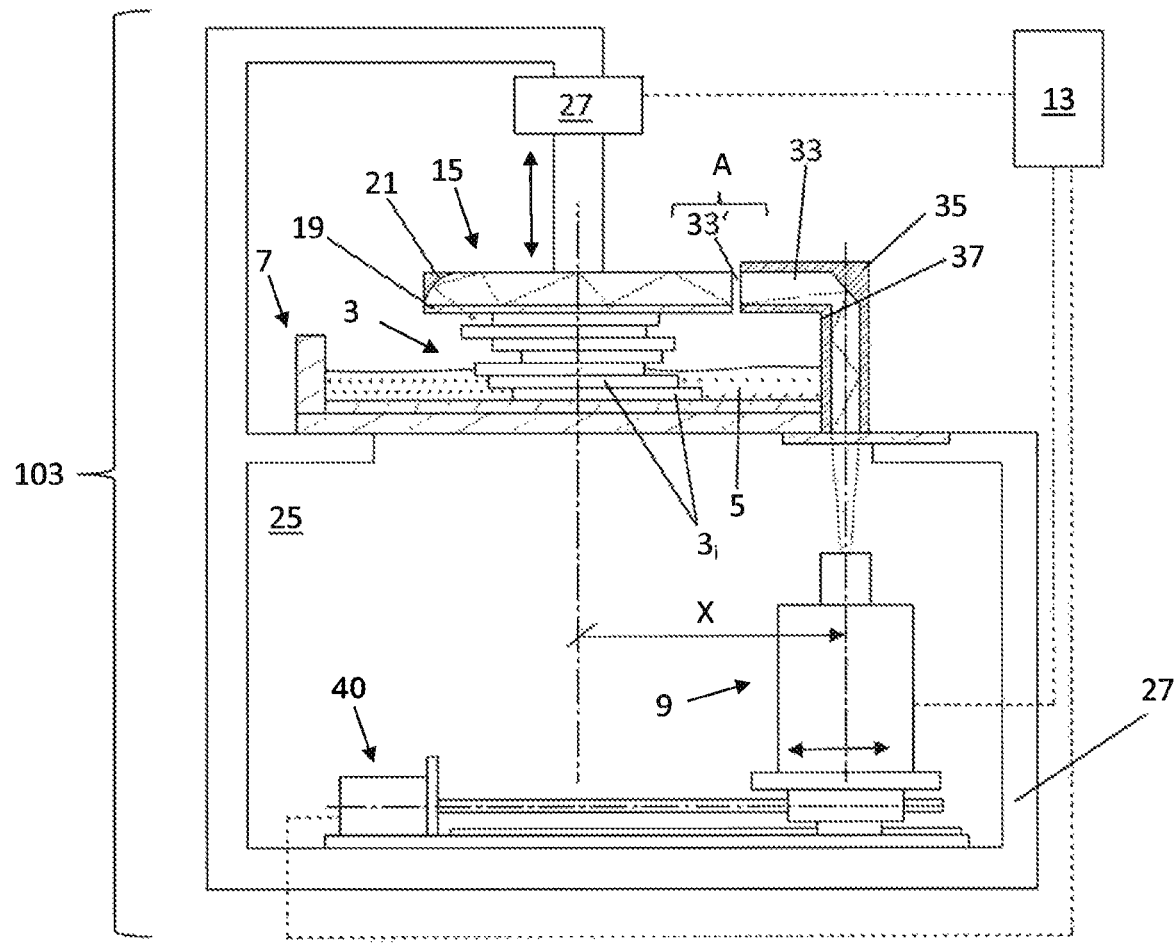

The stereolithography device 103 illustrated in FIG. 4 has a movable and optionally focusable light source 9 (illustrated here as a system unit) which can be moved by the control unit 13 and with the aid of at least one linear motor 40 which can be attached, for example, to the frame 27, which can be moved to a respective point X in the machine space 25 and/or whose focus can be set by the control device 13 in order to introduce primary radiation into the construction platform 15 as "secondary radiation" with the aid of the light waveguide 33. In another variant, for example, a special exposure image, e.g. a partial image or an edge zone image, see FIGS. 5 and 5a, can be used to conduct primary radiation, radiated through the light source 9, optionally via an at least partially movable mirror system, into the light guide 33, the emitted image not having to be focused. After successful coupling of the radiation into the optical waveguide 33, the light source 9 is moved by the control unit 13, for example, back into its original position, with the aid of the linear unit 40. The primary radiation source 9 is preferably realised to be focusable and movable, particularly preferably, the primary radiation can be coupled directly into the light guide 33, e.g. by moving a deflecting mirror, not represented, or by folding away a deflecting mirror, with or without movement of the light source 9.

Figure 5:
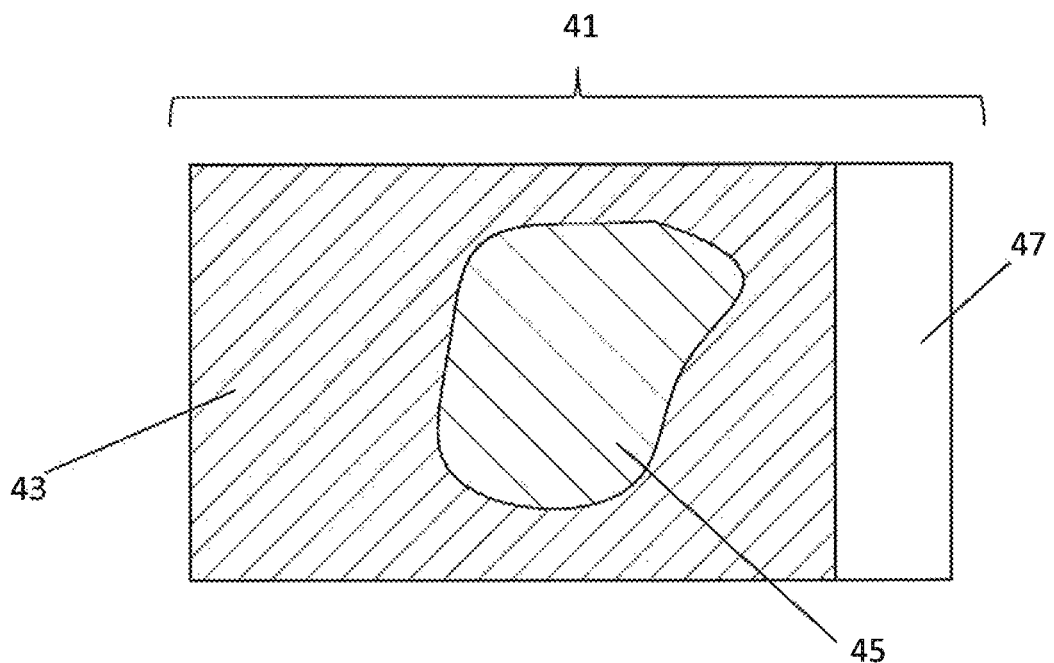
FIG. 5 and FIG. 5a show variants of the invention regarding the form of irradiation.
Figure 5A:
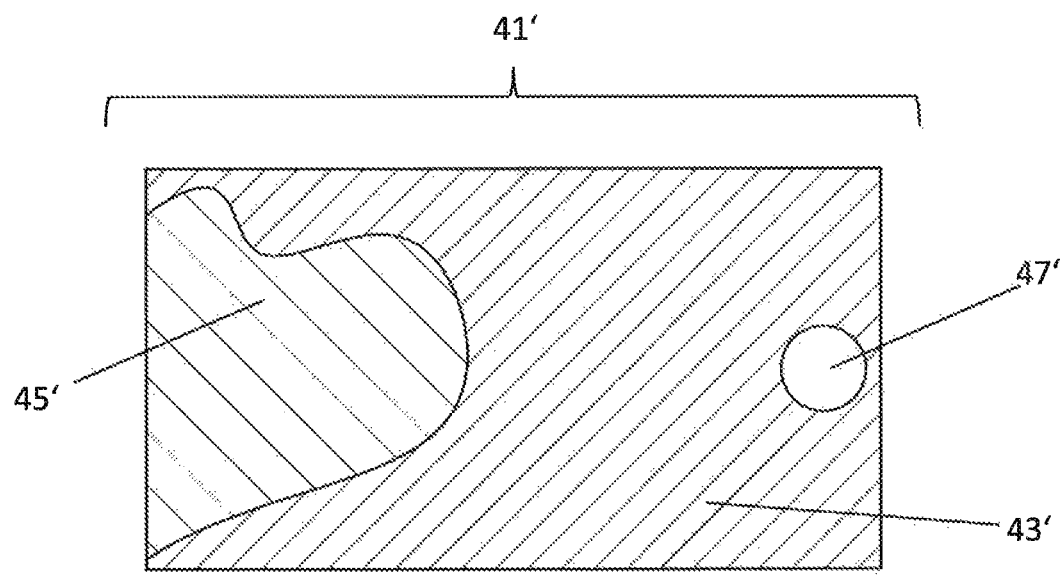

FIG. 5 and FIG. 5a show possible examples of an exposure mask 41 or 41' which serves for coupling primary radiation into at least one optical waveguide 33 (see FIG. 4) and thus for illuminating the construction platform 15 with primary radiation, it being possible, for example, to use the region 47 or 47' for the coupling in, and it being possible that layer information 45 or 45' is present, at least partially, for forming a component layer 3$i$ and optionally a non-exposed region 43, 43'. The primary radiation is introduced into the optical waveguide with the aid of the exposed region 47, 47'; in this case, the coupled-in wavelength can correspond to the wavelengths used for curing the layer, e.g. it can be of 388 nm; the primary light source 9 can preferably additionally emit a second radiation having another wavelength (e.g. 405 nm) which is used at least for illuminating the construction platform 15.

Figure 6:
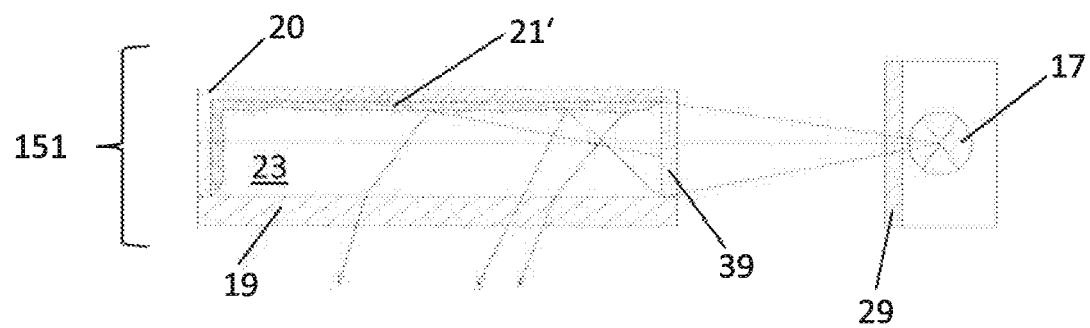
FIGS. 6 to 10 show variants of the radiation coupling into a construction platform.

FIG. 6 shows an advantageous embodiment variant of a construction platform 151 in which a secondary radiation space is formed which can be equipped at least partially with a diffusely reflecting, partially curved surface, for example a reflecting foil 21' or coating, which radiates the laterally entering secondary radiation as uniformly as possible over the at least partially transparent base plate 19. In this case, a window 39 can laterally close the secondary radiation space 23 at least partially and can be at least partially permeable to the secondary radiation in order to allow a coupling in of radiation. As secondary radiation source 17 serves, for example, at least one LED (e.g. UV LED) or a lamp (e.g. a UVC lamp) which is protected by a protective window 29.

Figure 7:
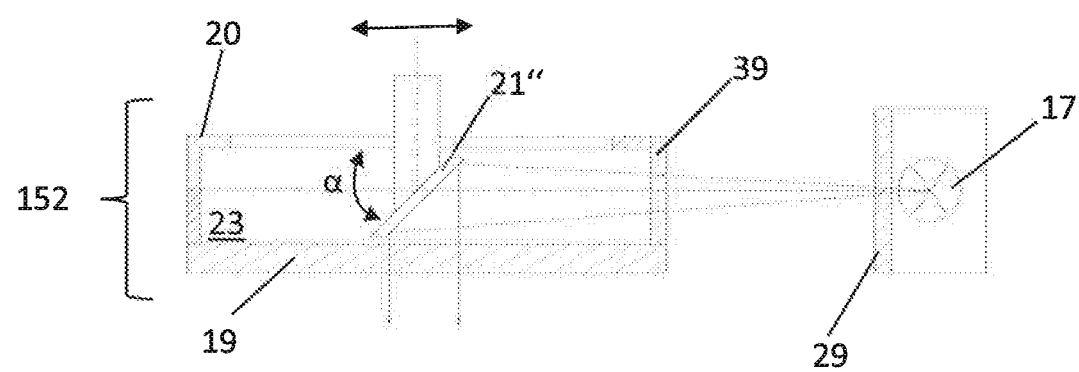

FIG. 7 shows a further variant of the construction platform 152 with a movable reflector 21" (e.g. a mirror) which can be inclined in an angle $\alpha$ (e.g. 45°) to the base plate 19 in order to thus allow an illumination of the base plate 19. In this case, the light source 17 preferably has an at least partially collimated beam path.

Figure 8:
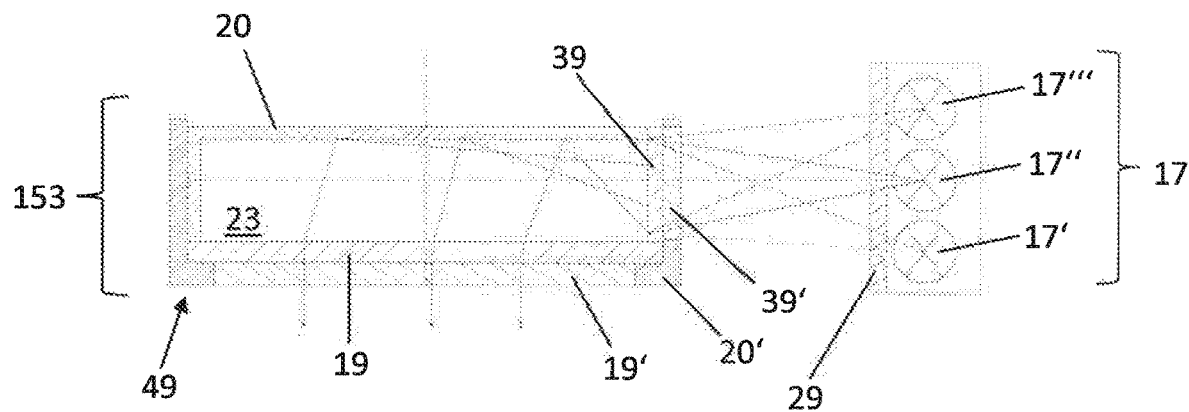

In FIG. 8, similarly to FIG. 7, a multi-part embodiment of the construction platform 153 is shown in a schematic view, an LED panel 17, in particular with individual LEDs 17', 17", 17''', etc., being used to provide the secondary radiation, which can be constructed from at least one LED type with a central wavelength, but preferably from different LED types, with different central wavelengths, e.g. 365, 405, 388 nm. The construction platform 153 is designed, e.g. in one piece, but optionally also in several pieces, and a cup-shaped lower part 49 can be separated from the construction platform 153 together with the additional windows 39, 39' and a holder 20'. The cup-shaped lower part 49 can also be formed in one piece, for example, by a transparent plastic part.

Figure 9:
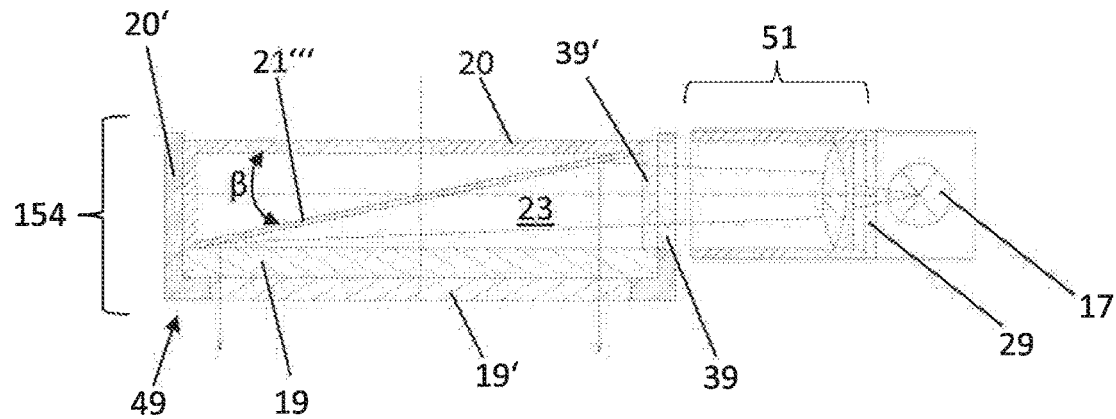

FIG. 9 shows an embodiment variant of the construction platform 154 in which a mirror 21''' is located, which is inclined in an angle $\beta$ to the base plate 19 and is located in the secondary radiation space 23. This variant has, for example, an optical system 51 which is configured to collimate the secondary radiation.

Figure 10:
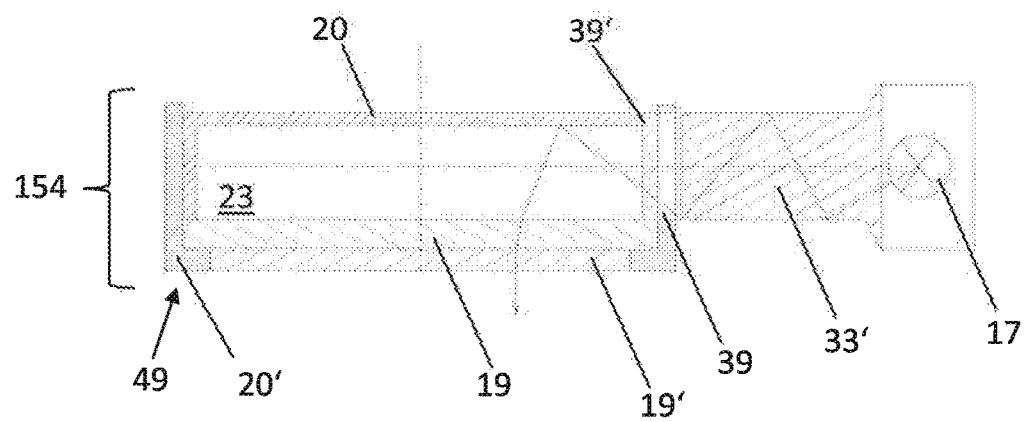

Finally, FIG. 10 illustrates an exemplary embodiment of the construction platform 154 in which the secondary radiation, see LED unit 17, is in turn laterally coupled into the hollow construction platform 154, namely via an optical waveguide 33' with total reflection of the radiation coupled in by the LED unit 17.

The invention claimed is:

1. A method for adhesive attachment of an object to an object carrier comprising a generally planar, radiation-permeable object carrier in a stereolithographic process; the method comprising forming the object by:
   curing of a photosensitive substance by curing radiation, at least in one partial region of the object carrier, radiating a secondary radiation to the object carrier in a direction different from a direction of the curing radiation to adhesively attach the object, wherein the secondary radiation is supplied laterally to the object carrier and is deflected by a reflector having a mirror surface within the object carrier.

2. The method according to claim 1, wherein the secondary radiation is derived from the curing radiation.

3. The method according to claim 1, wherein a radiation independent of the curing radiation is used as secondary radiation.

4. The method according to claim 1, wherein the secondary radiation is supplied to the object carrier via a light guide.

5. The method according to claim 1, wherein the secondary radiation is adjusted over an adhesion region during the adhesive attachment.

6. A stereolithographic object forming device comprising:
   an object carrier comprising a radiation-permeable generally planar object carrier having a reflector including a mirror surface;
   a first radiation source radiating a first stereolithography radiation in a first direction for curing a photosensitive substance;
   a second radiation source arranged laterally from the object carrier, the second radiation source supplying a second radiation laterally to the generally planar object carrier in a second direction different from the first direction, the second radiation source radiating at least a partial region of the object carrier to adhesively attach the object;
   wherein the object carrier is at least partially permeable to the second radiation, and wherein the second radiation is at least partially deflected by the reflector within the object carrier.

7. The device according to claim 6, wherein the second radiation source further comprises a light guide.

8. The device according to claim 7, wherein the light guide is connected to first radiation source in a light-conducting manner.

9. The device according to claim 6, wherein the second radiation source is separate and independent of the first radiation source.

10. The device according to claim 6, wherein the object carrier is partially permeable to the first radiation and at least partially reflective to deflect the second radiation to an adhesion region for the object.

11. The device according to claim 6, wherein the mirror surface comprises a diffusely reflecting surface.

12. The device according to claim 6, wherein the object carrier includes a movably arranged deflecting mirror.

13. The device according to claim 6, wherein the object carrier has an adhesion base plate which is at least partially permeable to the second radiation.

14. A stereolithographic object forming device comprising:
   an object carrier comprising a radiation-permeable generally planar object carrier, the object carrier including a mirror surface;
   a first radiation source radiating a first stereolithography radiation in a first direction for curing a photosensitive substance;
   a second radiation source supplying a second radiation to the generally planar object carrier in a second direction different from the first direction, the second radiation source radiating at least a partial region of the object carrier to adhesively attach the object;
   wherein the object carrier is at least partially permeable to the second radiation, and wherein the second radiation is at least partially deflected within the object carrier.

15. The device according to claim 14, wherein the second radiation source is independent of the first radiation source.

16. The device according to claim 14, wherein the first radiation source comprises a first light and the second radiation source comprises a separate second light.

17. The device according to claim 14, wherein at least one of and the second radiation source comprises a movable radiation source.

18. The device according to claim 14, wherein at least one of and the second radiation source comprises a focusable radiation source.

19. A method for adhesive attachment of an object to an object carrier comprising a radiation-permeable generally planar object carrier in a stereolithographic process; the method comprising forming the object by:
   curing a photosensitive substance by curing first radiation;
   radiating a secondary radiation to at least in a partial region of the object carrier in a direction different from a direction of the first radiation to adhesively attach the object;
   wherein the secondary radiation is supplied to the generally planar object carrier and is at least partially deflected by a reflector having a mirrored surface within the object carrier.

20. The method according to claim 19, comprising moving at least one of first radiation source and the second radiation source.

21. The method according to claim 20, comprising focusing at least one of first radiation source and the second radiation source.

* * * * *